(12) United States Patent
Brown et al.

(10) Patent No.: US 7,918,281 B2
(45) Date of Patent: Apr. 5, 2011

(54) METHOD OF TREATING FLOW CONDUITS AND VESSELS WITH FOAMED COMPOSITION

(75) Inventors: James Michael Brown, Lago Visa, TX (US); John Gregory Darby, Lafayette, LA (US)

(73) Assignee: Baker Hughes Incorporated, Houston, TX (US)

(*) Notice: Subject to any disclaimer, the term of this patent is extended or adjusted under 35 U.S.C. 154(b) by 41 days.

(21) Appl. No.: 12/351,699

(22) Filed: Jan. 9, 2009

(65) Prior Publication Data
US 2009/0114247 A1    May 7, 2009

Related U.S. Application Data

(63) Continuation-in-part of application No. 11/714,683, filed on Mar. 6, 2007, now Pat. No. 7,475,730.

(51) Int. Cl.
*E21B 37/06* (2006.01)

(52) U.S. Cl. ...... 166/304; 166/300; 166/309; 134/22.11

(58) Field of Classification Search .................. None
See application file for complete search history.

(56) References Cited

U.S. PATENT DOCUMENTS

| | | | |
|---|---|---|---|
| 3,530,940 A * | 9/1970 | Raza et al. | 166/305.1 |
| 4,201,678 A | 5/1980 | Pye et al. | |
| 4,775,489 A | 10/1988 | Watkins et al. | |
| 5,129,457 A * | 7/1992 | Sydansk | 166/402 |
| 5,227,245 A * | 7/1993 | Brands et al. | 428/483 |
| 5,376,749 A | 12/1994 | Miller et al. | |
| 5,453,207 A | 9/1995 | Simpson et al. | |
| 5,484,488 A | 1/1996 | Hart et al. | |
| 5,741,758 A | 4/1998 | Pakulski | |
| 6,051,535 A | 4/2000 | Bilden et al. | |
| 6,410,489 B1 | 6/2002 | Zhang et al. | |
| 6,866,797 B1 | 3/2005 | Martin et al. | |
| 7,028,776 B2 | 4/2006 | Kirk | |
| 2004/0121917 A1 | 6/2004 | Pakulski | |
| 2006/0124301 A1 | 6/2006 | Gupta et al. | |
| 2006/0124302 A1 | 6/2006 | Gupta et al. | |
| 2006/0223713 A1 | 10/2006 | Pakulski et al. | |
| 2008/0135476 A1 | 6/2008 | Pescher | |
| 2008/0251250 A1* | 10/2008 | Brezinski et al. | 166/179 |

* cited by examiner

*Primary Examiner* — Zakiya W. Bates
(74) *Attorney, Agent, or Firm* — John Wilson Jones; Jones & Smith, LLP

(57) ABSTRACT

The annular surface between the tubing and casing of an oil or gas well as well as flow conduits and vessels may be contacted with a foamed treatment composition containing a gas, a foaming agent and a treatment agent. The treatment agent may be an inhibitor or removal agent for scales, corrosion, salts, paraffins or asphaltenes. The foam, upon destabilization, renders a thin film of concentrated treatment agent on the external surfaces of the tubing, inside the casing and in the perforations of the oil or gas well or on the flow conduits or vessels.

20 Claims, 3 Drawing Sheets

METHOD OF TREATING FLOW CONDUITS AND VESSELS WITH FOAMED COMPOSITION

This application is a continuation-in-part application of U.S. patent application Ser. No. 11/714,683, filed on March 6, 2007, now U.S. Pat. No. 7,475,730.

FIELD OF THE INVENTION

Unwanted contaminants may be inhibited and/or removed by introducing a foamed composition containing a treatment agent into a gas or oil well. The foamed composition may further be used to inhibit and/or remove contaminants in equipment and flow conduits used in gas or oil production, refineries or fluid processing facilities.

BACKGROUND OF THE INVENTION

Oilfield fluids (e.g., oil, gas, and water) are generally complex mixtures of aliphatic hydrocarbons, aromatics, heteroatomic molecules, anionic and cationic salts, acids, sands, silts, clays and a vast array of other components. The nature of these fluids, combined with the severe conditions of heat, pressure, and turbulence to which they are often subjected, are contributory factors to the formation and deposition of contaminants, such as scales, salts, paraffins, corrosion, bacteria and asphaltenes in oil and/or gas production wells. Such contaminants also form in equipment and flow conduits used in gas production and oil production as well as in refineries and fluid processing facilities.

A common site for the formation and deposition of such contaminants in oil or gas wells is the annular space between the production tubing and casing. The annulus may be a static area or may produce gas or liquid. In low pressure gas wells, such as coal bed methane wells, the gas is produced up the annulus and the liquid (water) is allowed to fall to the liquid level and removed via a submersible pump up the tubing. Such undesirable substances as salt, scales, paraffins and asphaltenes form due to the pressure changes at the perforations. Alternatively, such substances form due to commingling of incompatible waters from one set of perforations to another. The formation and deposition of such contaminants decrease permeability of the subterranean formation and reduce well productivity. For instance, in some completions, the presence of scale in the annulus may make it difficult or impossible to remove the tubing for servicing.

In addition to being formed in oil and gas wells, such contaminants further form in equipment and flow conduits used in the production of oil, gas and other fluids. For instance, an acute problem develops when such contaminants develop in equipment and flow conduits used in gas and oil production, refineries and other fluid processing facilities.

While there are a number of approaches to the inhibition and/or removal of contaminants in the patent and journal literature, nearly all of them deal with the problem on an individual basis as they form, which can be costly when numerous problems arise during operations. A further problem with such an approach is the cost of tracking and monitoring the effectiveness of the selected approach.

For example, in oil and gas production, the technique of "downhole squeezing" is commonly used to address oil field scale formation, wherein a slug of the treatment composition is injected into the annulus, using a pre-flush, squeeze, and overflush treatment before the well can be returned to normal function. However, the overflush process often flushes a significant portion of the treatment agent such the remaining treatment agent is gradually removed from the surface as oil production continues. Thus, further descaling treatments are typically required.

Treatment methods of the prior art are typically inefficient in that contact with all surfaces containing the contaminants is typically required though often not completely attained. In addition, large quantities of the treatment agent are often required in order to effectuate the desired result.

Alternative treatment methods have therefore been sought for introducing treatment agents into oil and/or gas wells as well as equipment and flow conduits used in the production of oil and gas as well as equipment and flow conduits used in refineries and fluid processing facilities.

SUMMARY OF THE INVENTION

The invention relates to a method of contacting the annular surface between the tubing and casing of an oil or gas well with a foamed treatment composition which contains a gas, a foaming agent and a liquid treatment agent, such as a scale inhibitor, corrosion inhibitor, salt inhibitor, scale remover or biocide.

In addition, the invention relates to a method of removing unwanted deposits from the surface of a flow conduit or a vessel with a foamed treatment composition containing a gas, foaming agent and liquid treatment agent.

Use of the foamed treatment composition described herein is particularly advantageous since its liquid volume is low compared to its bulk volume. As a result, a foam quality greater than 90 percent is possible. Such low liquid volumes are advantageous due to economic savings in the volume of treatment agent. When used in gas or oil wells, such low liquid volumes impart a lower hydrostatic loading in the well.

The foam used in the foamed treatment composition is self-supporting. The foamed treatment composition is capable of completely packing the annular area of the well as well as covering the surface of a flow conduit or vessel.

The foamed treatment composition may be generated on-site using a foam generator which blends the gas, foaming agent and liquid treatment agent under high shear. Nitrogen and inert gases, such as argon, are the preferred gases since they do not contribute to corrosion from oxygen contamination. Such gases from compressed cylinders may be used or the gas may be generated on-site. Produced natural gas can also be used as a gas for foam generation.

After a period of time, the foam breaks leaving behind a thin film of the concentrated treatment agent. When used in oil or gas wells, the concentrated treatment agent coats the external surfaces of the tubing, inside the casing and in the perforations. When used to remove deposits from the surfaces of flow conduits or vessels, the concentrated treatment agent coats the surfaces of the flow conduits or vessels. As a result, the method of the invention provides a lasting treatment to inhibit and/or remove scales, salts, asphaltenes, paraffins, corrosion, etc. The treatment agent may further be a biocide and thus the method of the invention may be used to destroy bacterial contamination in the oil or gas well, flow conduit or vessel.

The foaming agent is preferably amphoteric or anionic. Suitable amphoteric foaming agents include alkyl betaines, alkyl sultaines and alkyl carboxylates. Suitable anionic foaming agents include alkyl ether sulfates, ethoxylated ether sulfates, phosphate esters, alkyl ether phosphates, ethoxylated alcohol phosphate esters, alkyl sulfates and alpha olefin sulfonates. Cationic foaming agents may also be used, such as when the treatment agent is cationic in nature, such as certain biocides. Suitable cationic foaming agents include alkyl quaternary ammonium salts, alkyl benzyl quaternary ammonium salts and alkyl amido amine quaternary ammonium salts.

BRIEF DESCRIPTION OF THE DRAWINGS

In order to more fully understand the drawings referred to in the detailed description of the present invention, a brief description of each drawing is presented, in which.

DETAILED DESCRIPTION OF THE PREFERRED EMBODIMENTS

Figure 1:
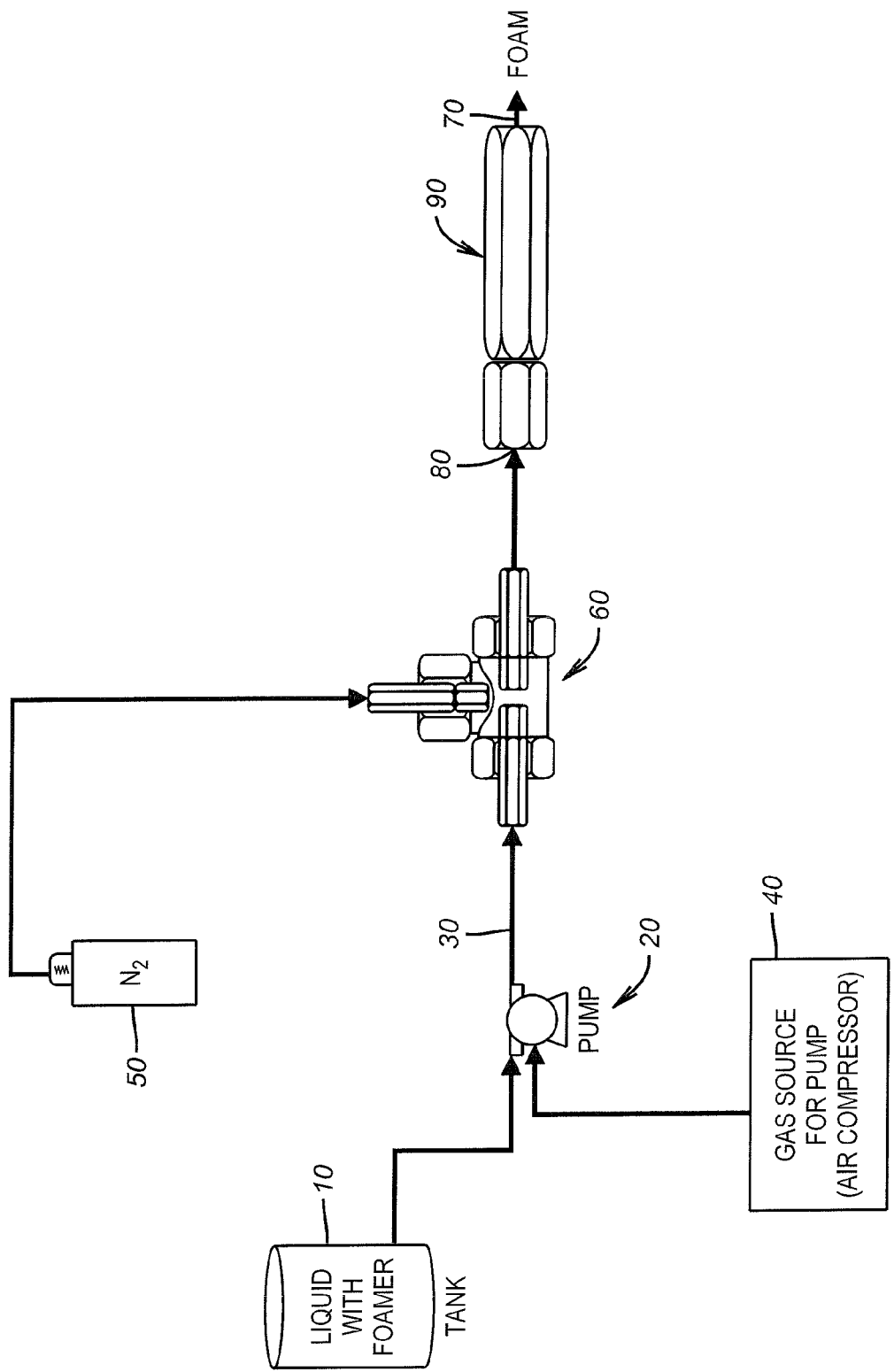
FIG. 1 is a schematic for a foam generator, used for preparation of the foamed treatment composition on-site.

The foamed treatment composition disclosed herein contains a treatment agent which is capable of inhibiting the formation and/or deposition of such contaminants as scales, corrosion, salts, paraffins and asphaltenes. In addition, the treatment agent may be a biocide and thus the foamed treatment composition may be used to eliminate the presence of bacteria. Further, the treatment agent may be one which is capable of removing such contaminants.

In a preferred embodiment, the foamed treatment composition is used to treat the annulus between the production tubing string and the casing string of an oil or gas well. Such annuli are devoid of sealing or isolation packers which are widely used to isolate one zone of the well from another zone.

While the foamed treatment composition may be used to treat any type of well that requires annular treatment including high pressure and low pressure wells. In a preferred embodiment the foamed treatment composition is used to treat low pressure wells. An example of low pressure wells suitable for using the foamed treatment composition defined herein are those low pressure wells (of between about 1 to about 100 psi) such as coal bed methane wells produced through the casing. Such wells produce water associated with the gas which is then pumped through the tubing via rod pumps. These types of wells are perforated in many coal seams with varying productivity in each zone.

The foamed treatment composition described herein may further be used to remove deposited contaminants which forms on flow conduits or vessels. For instance, during the production of oil and gas from wells, it is not uncommon for scales, rust, salts, paraffins and asphaltenes to be deposited onto surfaces of flow conduits or vessels. The foamed treatment composition described herein may be used to inhibit the deposition of such materials and/or remove such deposits upon their formation.

The foamed treatment composition further has particular applicability in the inhibition and/or removal of contaminants from flow conduits and vessels used in refineries and fluid processing facilities. Thus, in addition to their being used in the treatment of oil and gas wells, the foamed treatment composition find applicability in refining and chemical industries. The treatment compositions therefore have applicability in the treatment of flow conduits including pipelines and flow lines as well as transmission and process piping including the piping used to connect vessels in chemical treatment plants as well as refineries.

The treatment compositions may be effective in the removal of contaminants on metallic as well as non-metallic surfaces. In a preferred embodiment, the treated compositions are used to remove contaminants on metallic surfaces, such as high alloy steels, including chrome steels, duplex steels, stainless steels, martensitic alloy steels, ferritic alloy steels, austenitic stainless steels, precipitation-hardened stainless steels and high nickel content steels.

The foamed treatment composition, in addition to at least one treatment agent, further contains a gas, foaming agent and at least one treatment agent.

Exemplary of treatment agents used in the foamed treatment composition are one more inhibitors or removal agents for such unwanted deposits as scales, rust, salts, paraffins and asphaltenes as well as biocides.

The treatment agent is preferably a liquid material. If the treatment agent is a solid, it can be dissolved in a suitable solvent, thus making it a liquid.

The treatment agents may be any of those commonly known in the art. In a preferred embodiment, the treatment composition is used to remove scales (such as iron sulfides or mineral scales like calcium carbonate) or inhibit the formation of scales. Suitable scale inhibitors or removal agents include phosphates, phosphate esters, phosphoric acid, phosphonates, phosphonic acid, phosphonate/phosphonic acids, polyacrylamides, salts of acrylamido-methyl propane sulfonate/acrylic acid copolymers (AMPS/AA), phosphinated maleic copolymers (PHOS/MA), salts of a polymaleic acid/acrylic acid/acrylamido-methyl propane sulfonate terpolymer (PMA/AMPS) as well as mixtures thereof. Phosphonate/phosphonic acid type scale inhibitors are often preferred in light of their effectiveness to control scales at relatively low concentration. Polymeric scale inhibitors, such as polyacrylamides, salts of acrylamido-methyl propane sulfonate/acrylic acid copolymer (AMPS/AA), phosphinated maleic copolymer (PHOS/MA) and sodium salt of polymaleic acid/acrylic acid/acrylamido-methyl propane sulfonate terpolymers (PMA/AMPS) are also effective scale inhibitors. Sodium salts are preferred.

Further, preferred as scale inhibitors and/or scale removal agents are alkyl-substituted phosphonium compounds and alkyl-substituted phosphines such as alkyl-substituted phosphonium compound of formula (I):

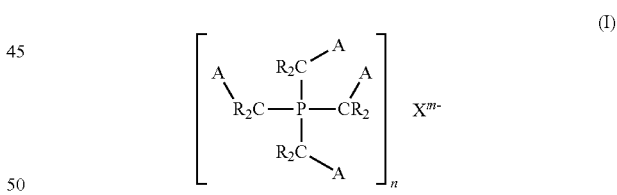

or alkyl-substituted phosphines of formula (II):

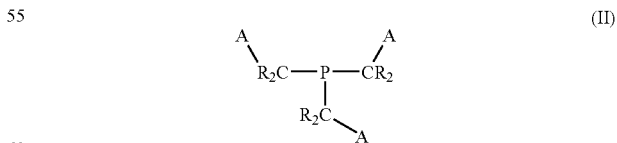

wherein X is an anion; n is the valency of X represented by m; each A are the same or different and are selected from the group consisting of —OH, —OR$^1$, —SO$_3$R$^1$, —PO$_3$(R$^1$)$_2$, —COOH, —COOR$^1$, SO$_3$H, —PO$_3$H$_2$, —CH$_2$COOH, substituted alkyl, aryl or substituted amino groups; each R and each R$^1$ is independently selected form the group consisting of hydrogen, a $C_1$ to $C_{20}$ alkyl, aryl, substituted alkyl or aryl, carboxy or carboxy ester. Such compounds include those disclosed in U.S. Patent Publication No. 2008/0135476, herein incorporated by reference.

In a preferred embodiment, the alkyl-substituted phosphonium compounds for use as treatment agent are tetrakis(hydroxymethyl)phosphonium sulfate (THPS), tetrakis (hydroxymethyl)phosphonium chloride, tetrakis (hydroxymethyl)phosphonium bromide, tetrakis (hydroxymethyl)phosphonium acetate and tetrakis (hydroxymethyl) phosphonium phosphate.

Further, treatment agents acidic in nature, such as minerals acid and weak organic acids may be used for the removal of scales. Suitable mineral acids include hydrochloric acid and phosphoric acids and suitable minerals acids include acetic acid and formic acid. Caustic scale removal agents may also be used. Such caustic removal agents, of particular applicability in the removal of sulfate scales, include sodium hydroxide, chelants such as EDTA, glucoheptanate and urea.

Treatment agents for the inhibition and/or removal of paraffins include, but are not limited to, ethylene/vinyl acetate copolymers, acrylates (such as polyacrylate esters and methacrylate esters of fatty alcohols) and olefin/maleic esters.

Suitable corrosion inhibitors or rust removal agents useful for the practice of the invention include but are not limited to fatty imidazolines, alkyl pyridines, alkyl pyridine quaternaries, fatty amine quaternaries and phosphate salts of fatty imidazolines.

Exemplary asphaltene treating chemicals include but are not limited to fatty ester homopolymers and copolymers (such as fatty esters of acrylic and methacrylic acid polymers and copolymers) and sorbitan monooleate.

Suitable foaming agents include, but are not limited to, those which are amphoteric, anionic and cationic. Preferred anionic foaming agents include betaines, alkyl ether sulfates, oxyalkylated sulfates, alkoxylated alcohol sulfates, phosphate esters, alkyl ether phosphates, alkoxylated alcohol phosphate esters, alkyl sulfates as well as alpha olefin sulfonates. Included as amphoteric surfactants are glycinates, amphoacetates, propionates, betaines and mixtures thereof. Cationic foaming agents are especially useful where the treatment agent employed is also cationic. For instance, cationic foaming agents have particular applicability with cationic biocides. Suitable cationic foaming agents include alkyl quaternary ammonium salts, alkyl benzyl quaternary ammonium salts and alkyl amido amine quaternary ammonium salts.

Typically, the amount of foaming agent present in the foamed treatment agent is that amount sufficient to give a foam quality of 90 percent or higher. The foam quality is a measurement of the lowest amount of liquid volume of treatment agent that is required to effectuate the desired result. Thus, a 90 percent quality foam refers to the use of 100 ml of foamed treatment agent which, upon destabilization, rendered 10 ml of liquid treatment agent.

The gas used in the foamed treatment composition is any gas which is acceptable for forming a foam for use in treatment applications and includes nitrogen, inert gases like argon as well as produced natural gas.

The foamed treatment compositions used in the invention do not require excessive amounts of treatment agents. The amount of treatment agent in the composition is that amount sufficient to effectuate the desired result over a sustained period of time. Generally, the amount of treatment agent in the composition is from about 0.05 to about 5 (preferably from about 0.1 to about 2) volume percent based upon the total volume of the composition. Use of the foamed treatment composition permits low liquid volumes of the treatment agent to be used. Typically, the amount of treatment agent used per treatment is no more than one to ten gallons. With some applications, even lower amounts may be used. For instance, the amount of scale inhibitor in the foamed well treating composition may be as low as 1 ppm.

Costs of operation are significantly lowered when used in accordance with the procedures set forth herein. As a result of such operations, the surface of the contact area is completely covered though low amounts of the treatment composition are used. Further, when used to treat flow conduits or vessels, it is not necessary to flood the vessel or flow conduit with a large volume of treatment composition.

Generally, the lifetime of a single treatment using the foamed treatment composition of the invention is between one and twelve months.

The foamed treatment composition typically has a half-life less than or equal to 1 hour.

In a preferred embodiment, a truck mounted foam generating apparatus consisting of compressed gas bottles, such as nitrogen, one or more treatment agent containing tanks, one or more foaming agent tanks, one or more associated chemical pumps and one or more foam generators may be used to travel to a designated target site wherein the treatment is applied.

A suitable foam generating apparatus which may be used on-site is depicted in FIG. 1. A treatment agent and liquid foaming agent are held in treatment agent tank 10 and is introduced into line 30 via air pump 20. Pump 20 may be driven by gas from gas source 40. Alternatively an electric or engine powered pump could also be used. The liquid foaming agent is admixed with a gas, such as nitrogen, held in gas tank 50, in tee 60 under shear. The foamed treatment composition enters into the target site at 70 after passing through small orifice 80 into hose 90.

The foamed treatment composition introduced into the targeted site is stable. After introduction into the targeted site, the foam is allowed to break without the use of destabilizing agents or is broken or destabilized principally by the action of heat or, optionally, the presence of a defoaming agent. Suitable defoaming agents include silicones, alcohols and hydrocarbon fluids like diesel fuel. As a result of such destabilization, a thin concentrated film of the treatment agent coats the desired site. For instance, when used in the production of oil or gas wells, a thin concentrated film of the treatment agent coats the outside of the tubing and/or inside of the casing of the packerless annulus.

The thickness of the coated film will be dependent upon the amount of treatment agent introduced into the target site.

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

All percentages set forth in the Examples are given in terms of volume percent except as may otherwise be indicated and the term "complex organic phosphate ester, free acid" refers to a product commercially available from Rhodia.

EXAMPLES

Examples 1-4

To a foaming agent composed of 60% $C_{14}$-$C_{15}$ alkyl olefin sulfate, 18% ammonium alkyl ether sulfate, 10% monoalkyl ester and 12% isopropyl alcohol was added a treatment agent (WTA), water and nitrogen. The admixture was then foamed using the foaming apparatus set forth in FIG. 1. The foam quality of the foamed product was then determined. The results are set forth in Table I:

TABLE I

| Ex. No. | Foaming Agent, Amount | Type, WTA | WTA | WTA, Amount | Water | N₂ Pressure, psi | Foam Quality, % |
|---|---|---|---|---|---|---|---|
| 1 | 120 mls | Scale Remover | HCl, 28% | 140 mls | 12,000 mls | 40 | 95 |
| 2 | 120 mls | Scale Remover | HCl, 28% | 1 qt | 5 gallons | 60 | 97 |
| 3 | 2% | Scale Inhibitor | HEDP | 6% | Yes | 60 | 95 |
| 4 | 2% | Scale Inhibitor | HEDP | 12% | Yes | 60 | 97 |

HEDP = (hydroxethylidenediphosphonic acid)

Examples 5-9

The foamed treatment composition of Example 4 was introduced into an annulus at defined pressure. The residual concentration of treatment agent was measured in produced water. The results are set forth in Table II:

TABLE II

| Ex. No. | Casing Pressure, psi | Tubing Pressure, psi | Nitrogen, psi | Injection Pressure, psi | Time to Pump, hrs:min | Liquid Volume, gallons | Residual After One Month |
|---|---|---|---|---|---|---|---|
| 5 | 18 | 6 | 80 | 18 | 1:15 | 36 | NA |
| 6 | 29 | 40 | 80 | 29 | 1:20 | 29 | 31.82 ppm |
| 7 | 14 | 0 | 75 | 14 | 2:20 | 42 | 145.29 ppm |
| 8 | 5 | 0 | 80 | 20 | 2:15 | 38 | 116.7 ppm |
| 9 | 20 | 0 | 75 | 25 | 4:00 | 43 | 26.25 ppm |

Example 10

A corrosion inhibitor was prepared by mixing 65.70 ml of deionized water, 25 ml of coco-dimethyl benzyl quat, 8 ml of complex organic phosphate ester, free acid, 0.2 ml of thioglycolic acid and 1.10% of monoethanolamine. Approximately 1 gallon of the corrosion inhibitor was mixed with 1 gallon of water and was then mixed with 1.5% of amphoteric cocoamidopropyl betaine as foaming agent to render 60 gallons of foam.

Examples 11-15

To a 1.5% amphoteric cocoamidopropyl betaine was added a treatment agent (WTA) at 60 psi nitrogen pressure. The foam quality of the foamed product was then determined. The results are set forth in Table III:

TABLE III

| Ex. No. | Type, WTA | WTA | Foam Quality, % |
|---|---|---|---|
| 11 | Scale Inhibitor | 12% HEDP | 97 |
| 12 | Biocide | 20% THPS | 98 |
| 13 | Corrosion Inhibitor | Formula A, diluted 50% with water | 97 |
| 14 | Corrosion Inhibitor | Formula B, diluted 50% with water | 97 |
| 15 | Corrosion Inhibitor | Formula C, diluted 50% with water | 96 |

THPS = phosphonium tetrakis hydroxymethyl sulfate
Formula A: 58 ml deionized water, 24 ml methyl alcohol, 7 ml alkyl pyridine benzyl quaternary ammonium chloride/aliphatic and heterocyclic mono/diamine (non-ionic and anionic surfactant blend), 7 ml morpholine process residue and 4 ml complex organic phosphate ester, free acid.
Formula B: 47 ml of deionized water, 35 ml methyl alcohol, 2.5 ml complex organic phosphate ester, free acid, 10 ml coco dimethyl benzyl quat, 2.5 ml ethoxylated (15) soya alkylamines, 3 ml alkyl pyridine benzyl quaternary ammonium chloride.
Formula C: 58.5 ml deionized water, 24 ml methyl alcohol, 3 ml coco dimethyl benzyl quat, 2 ml complex organic phosphate ester, free acid, 6 ml alkyl pyridine benzyl quaternary ammonium chloride, 1.5 thioglycolic acid and 5 ml fatty imidazoline.

Example 16

A foamed composition was prepared similar to Example 3 except that the treatment agent was tetrakis(hydroxymethyl) phosphonium phosphate. The downstream lines of the Equitable natural gas pipeline in Yawkey, W. Va. were treated for iron sulfide contaminants. Prior to foaming the treatment composition, a flowback tank was set at the termination point of the line and the pipeline was shut-in at both ends. A defoamer was placed in the flowback tank, the line was bled down and the foamed treatment composition was injected two miles upstream. The liquid phase of the foamed treatment composition consisted of 900 gallons of liquid and was pumped over four hours. Immediately after pumping ceased, the gas line was reopened at the injection point and the flow from the line was directed into the flowback tank. When the methane content of the gas reached 95 percent, flow was diverted through a separator, with the gas sent to the compressor station and liquids to the flowback tank. Ten barrels, or 420 gallons, of liquid were recovered at the tank, for a 47 percent liquid recovery rate at the termination point. The remaining liquid was caught in the drips.

Figure 2:
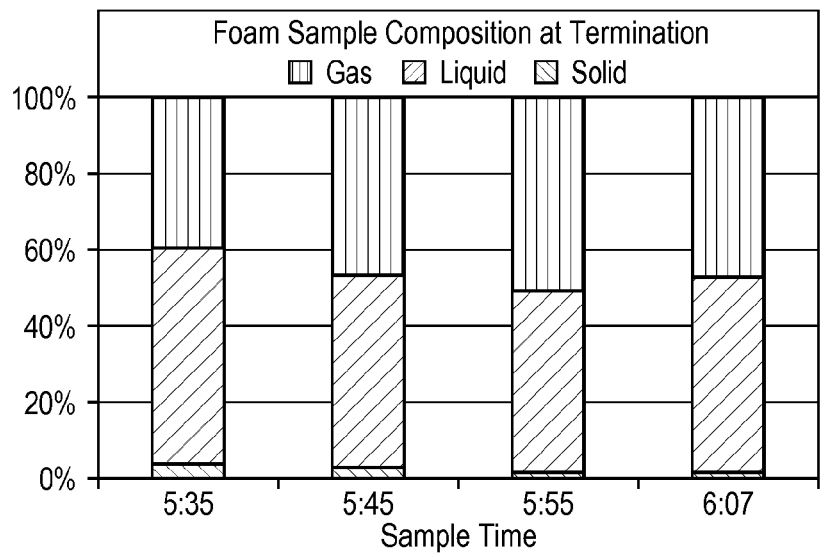
FIG. 2 depicts the percentages for the gas, liquid, and solid phases of the samples of Example 16 at the termination point.
Figure 3:
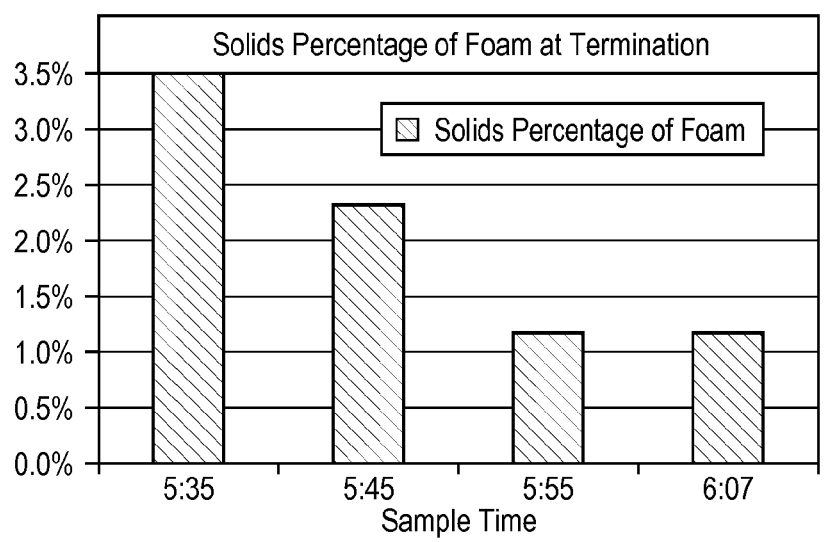
FIG. 3 depicts the percentage of solids of foam of the samples of Example 16 at the termination point.
Figure 4:
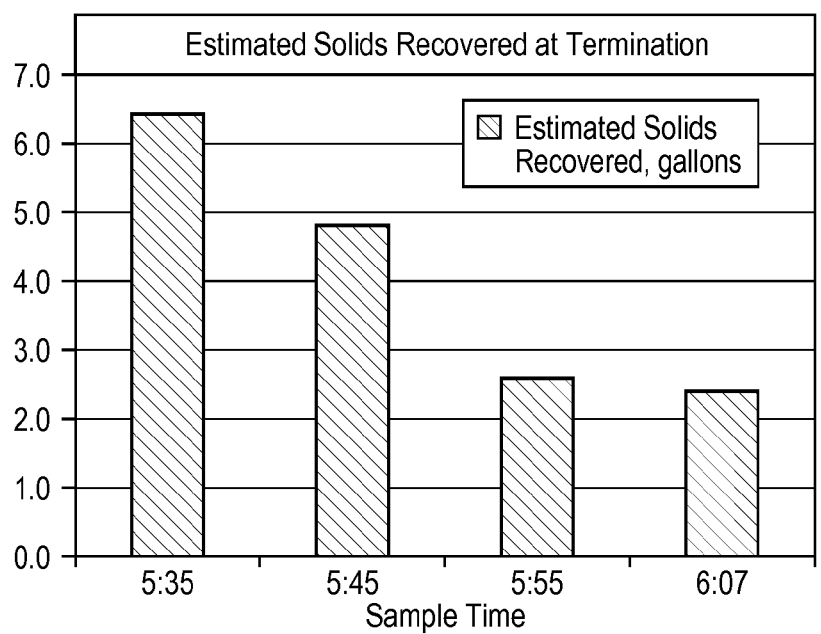
FIG. 4 depicts the estimated percentage of solids recovered from the samples of Example 16 at the termination point.

A sampling point was installed immediately upstream of the flowback tank to evaluate the cleanup. An initial large surge carrying black fines occurred as the line re-pressured, and was followed by a black foam dispersed with liquid slugs. Samples were taken at approximate ten minute intervals, and examined after three days. The percentages for the gas, liquid, and solid phases noted are presented graphically in FIG. 2. The solid sample volume averaged 2 percent, and is presented graphically in FIG. 3 for each sample time. The volume of solids recovered at the termination point was estimated at 16 gallons which was derived by dividing the percentage of solids recovered by the percentage of liquids recovered and multiplied by the total liquid recovered. This is represented in FIG. 4 for each sample point. The ratio of the solid to liquid recovery indicated that the cleaner removed and transported approximately 4 percent solids per liquid volume of cleaner used.

The results indicate a remedial solution having minimal downtime at low costs. The process is thus a viable option for cleaning an unpiggable natural gas pipeline over irregular terrain as the foamed treatment composition provided contact over the entire internal surface of the line and removed the waste products. The results indicate that overall cleaning was effectuated using a small liquid volume and was superior to pumping a liquid that may not provide full contact at all points in the system. The flowback tank was used to collect the waste material rather than move the contaminants to another point in the system. Further, downstream problems were not reported following the treatment.

From the foregoing, it will be observed that numerous variations and modifications may be effected without departing from the true spirit and scope of the novel concepts of the invention.

What is claimed is:

1. A method of removing unwanted deposits from a surface of a flow conduit or vessel which comprises introducing into the flow conduit or vessel a foamed treatment composition comprising a foaming agent and a treatment agent wherein the amount of foaming agent in the foamed treatment composition is an amount sufficient to provide a foam quality to the foamed treatment composition which is greater than or equal to 90% and further wherein, upon destabilization of the foamed treatment composition, a thin film concentrate of the treatment agent is coated over at least a portion of the surface.

2. The method of claim 1, wherein the treatment agent is an inhibitor or removal agent for unwanted deposits selected from the group consisting of scales, rust, salts, paraffins and asphaltenes.

3. The method of claim 1, wherein the foaming agent has a half-life less than or equal to 1 hour.

4. The method of claim 1, wherein the foaming agent is anionic or amphoteric.

5. The method of claim 4, wherein the foaming agent is an anionic foaming agent selected from the group consisting of alkyl ether sulfates, alkoxylated ether sulfates, phosphate esters, alkyl ether phosphates, alkoxylated alcohol phosphate esters, alkyl sulfates and alpha olefin sulfonates.

6. The method of claim 1, wherein the treatment agent is a removal agent for scales and is selected from the group consisting of mineral acids and weak organic acids.

7. The method of claim 6, wherein the treatment agent is selected from the group consisting of HCl, acetic acid and formic acid.

8. The method of claim 1, wherein the treatment agent is a removal agent scales and is selected from the group consisting of alkyl-substituted phosphonium compounds and alkyl-substituted phosphines.

9. The method of claim 8, wherein the treatment agent is an alkyl-substituted phosphonium compound of formula (I):

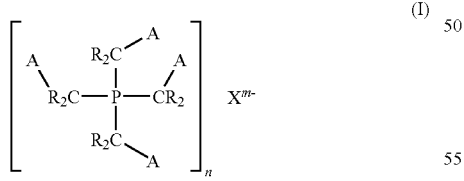

(I)

or an alkyl-substituted phosphine of formula (II):

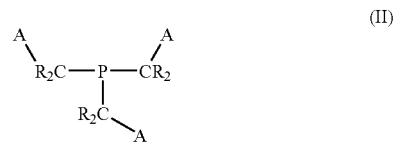

(II)

wherein X is an anion; n is the valency of X represented by m; each A are the same or different and are selected from the group consisting of —OH, —OR$^1$, —SO$_3$R$^1$, —PO$_3$(R$^1$)$_2$, —COOH, —COOR$^1$, SO$_3$H, —PO$_3$H$_2$, —CH$_2$COOH, substituted alkyl, aryl or substituted amino groups; each R and each R$^1$ is independently selected form the group consisting of hydrogen, a C$_1$ to C$_{20}$ alkyl, aryl, substituted alkyl or aryl, carboxy or carboxy ester.

10. The method of claim 9, wherein the alkyl-substituted phosphonium compound is selected from the group consisting of tetrakis(hydroxymethyl)phosphonium sulfate (THPS), tetrakis(hydroxymethyl)phosphonium chloride, tetrakis (hydroxymethyl)phosphonium bromide, tetrakis(hydroxymethyl)phosphonium acetate and tetrakis(hydroxymethyl)phosphonium phosphate.

11. The method of claim 1, wherein the surface is metallic or non-metallic.

12. The method of claim 1, wherein the flow conduit or vessel is used in the production of oil or gas, refineries or a fluid processing facility.

13. A method of removing unwanted deposits from a flow conduit or vessel which comprises introducing into the conduit or vessel a treatment composition comprising a foaming agent and a treatment agent wherein the treatment agent is present in the treatment composition in an amount sufficient such that a thin film of concentrate of the treatment agent coats at least a portion of the surface of the flow conduit or vessel upon breaking of the treatment composition.

14. The method of claim 13, wherein the treatment agent is an inhibitor or removal agent for unwanted deposits selected from the group consisting of scales, rust, salts, paraffins and asphaltenes.

15. The method of claim 14, wherein the treatment agent is at least one of the following:
   (a) scale treatment agents selected from the group consisting of phosphates, phosphate esters, phosphoric acid, phosphonates, phosphonic acid, phosphonate/phosphonic acids, polyacrylamides, salts of acrylamido-methyl propane sulfonate/acrylic acid copolymers (AMPS/AA), phosphinated maleic copolymers (PHOS/MA) and salts of a polymaleic acid/acrylic acid/acrylamido-methyl propane sulfonate terpolymer (PMA/AMPS), hydrochloric acid, acetic acid, formic acid, sodium hydroxide, EDTA chelants, glucoheptanate and urea;
   (b) corrosion treatment agents selected from the group consisting of fatty imidazolines, alkyl pyridines, alkyl pyridine quaternaries, fatty amine quaternaries and phosphate salts of fatty imidazolines;
   (c) paraffin treatment agents selected from the group consisting of ethylene/vinyl acetate copolymers, acrylates and olefin/maleic esters; and
   (d) asphaltene treatment agents selected from the group consisting of fatty ester homopolymers and copolymers and sorbitan monooleate.

16. The method of claim 14, wherein the treatment agent is a removal agent for scales and is selected from the group consisting of mineral acids and weak organic acids.

17. The method of claim 16, wherein the treatment agent is selected from the group consisting of HCl, acetic acid and formic acid.

18. The method of claim 14, wherein the treatment agent is a scale removal agent selected from the group consisting of alkyl-substituted phosphonium compounds and alkyl-substituted phosphines.

19. The method of claim 18, wherein the treatment agent is an alkyl-substituted phosphonium compound of formula (I):

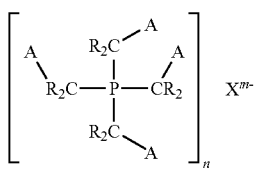
(I)

or an alkyl-substituted phosphine of formula (II):

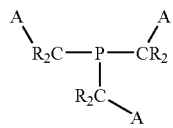
(II)

wherein X is an anion; n is the valency of X represented by m; each A are the same or different and are selected from the group consisting of —OH, —OR$^1$, —SO$_3$R$^1$, —PO$_3$(R$^1$)$_2$, —COOH, —COOR$^1$, SO$_3$H, —PO$_3$H$_2$, —CH$_2$COOH, substituted alkyl, aryl or substituted amino groups; each R and each R$^1$ is independently selected form the group consisting of hydrogen, a C$_1$ to C$_{20}$ alkyl, aryl, substituted alkyl or aryl, carboxy or carboxy ester.

20. The method of claim 19, wherein the alkyl-substituted phosphonium compound is selected from the group consisting of tetrakis(hydroxymethyl)phosphonium sulfate (THPS), tetrakis(hydroxymethyl)phosphonium chloride, tetrakis (hydroxymethyl)phosphonium bromide, tetrakis(hydroxymethyl)phosphonium acetate and tetrakis(hydroxymethyl)phosphonium phosphate.

* * * * *